UNITED STATES PATENT OFFICE.

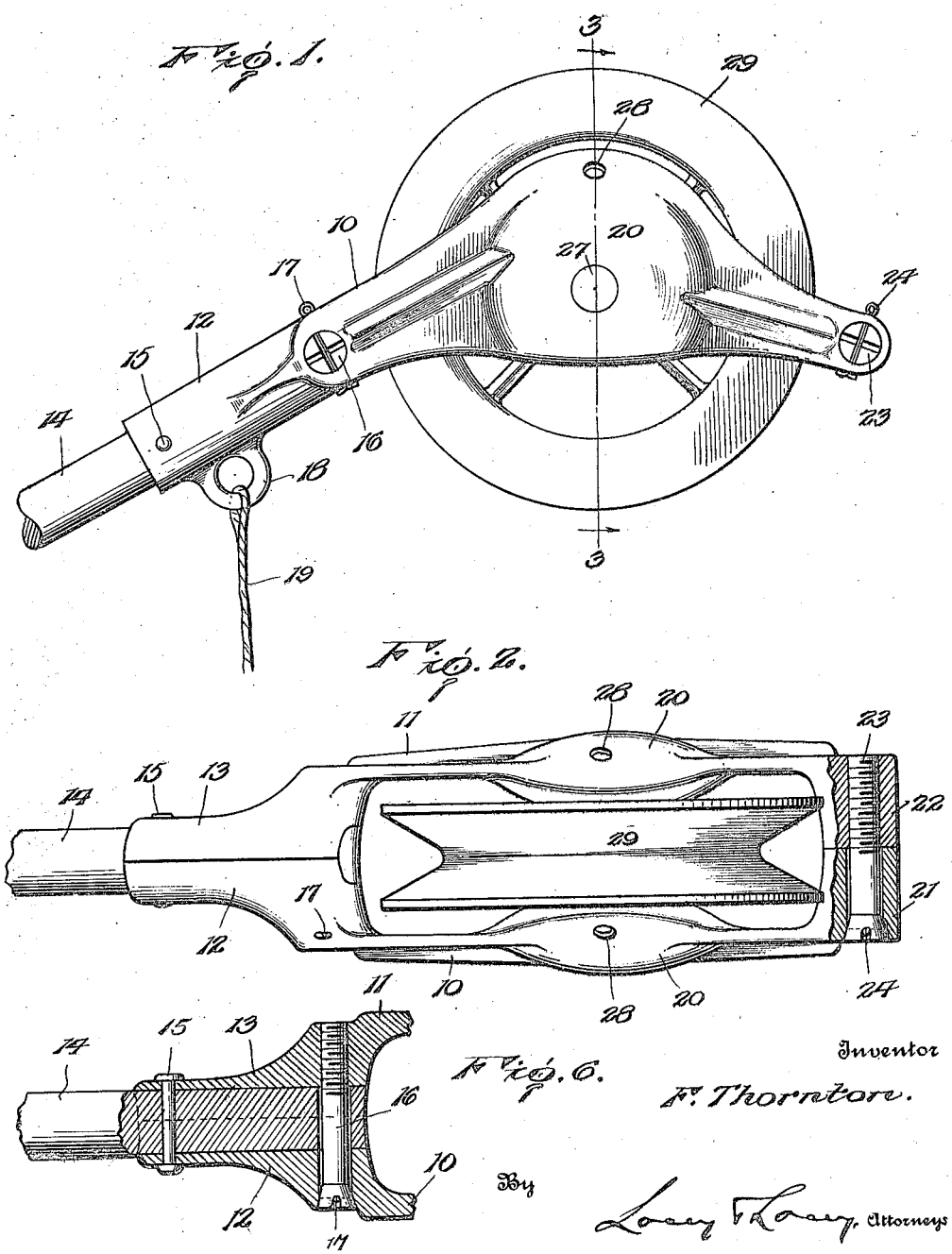

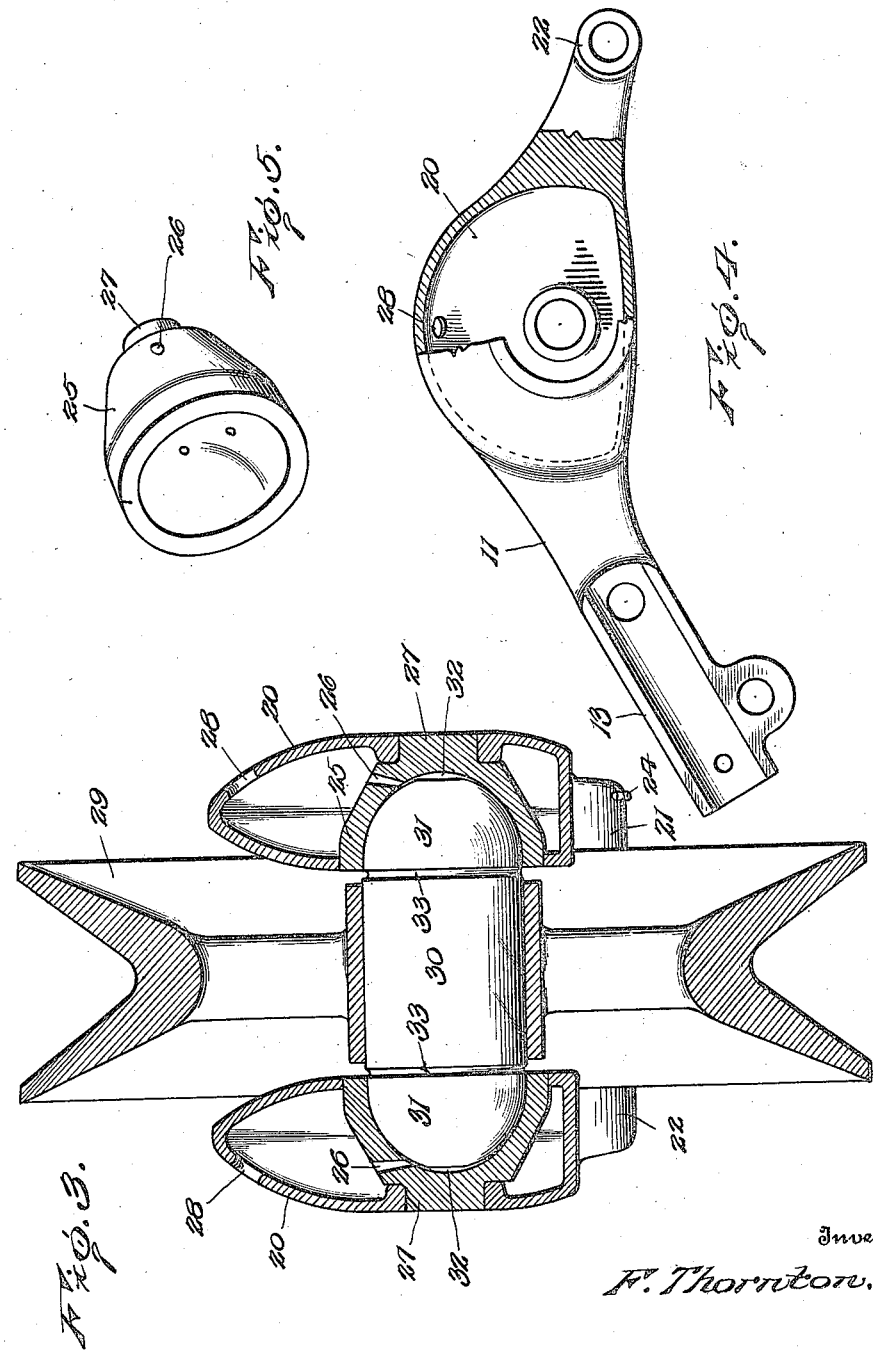

FREDERICK THORNTON, OF HUNTINGTON, WEST VIRGINIA, ASSIGNOR TO THORNTON TROLLEY WHEEL CO., OF ASHLAND, KENTUCKY, A CORPORATION OF KENTUCKY.

TROLLEY HARP.

1,424,950.  Specification of Letters Patent.  Patented Aug. 8, 1922.

Application filed September 9, 1920. Serial No. 409,093.

*To all whom it may concern:*

Be it known that I, FREDERICK THORNTON, citizen of the United States, residing at Huntington, in the county of Cabell and State of West Virginia, have invented certain new and useful Improvements in Trolley Harps, of which the following is a specification.

This invention relates to an improved trolley harp and has as one of its principal objects to provide a device of this character wherein wear upon the journals of the trolley wheel will be reduced to a minimum.

A further object of the invention is to provide a harp wherein lubricant will be constantly supplied to the journals of the wheel and wherein the feeding of the lubricant will be sure and dependable.

A still further object of the invention is to provide a harp employing bearing cups for the axle of the trolley wheel, wherein said cups may, should it become necessary, be readily renewed, and wherein said cups will be housed by the grease chambers provided, traversing said chambers in communication therewith.

Another object of the invention is to provide a harp wherein the trolley wheel may be readily removed therefrom and wherein means will be provided whereby wear in the journals of the trolley wheel may be readily taken up.

And the invention has as a still further object to provide a harp which will not, when the trolley pole moves toward a vertical position, interfere with the engagement of the trolley wheel with the trolley wire and wherein the harp will be firmly and safely secured upon the trolley pole.

Other and incidental objects will appear hereinafter.

In the drawings:

Figure 1 is a side elevation of my improved harp,

Figure 2 is a plan view of the device,

Figure 3 is a transverse section taken on the line 3—3 of Figure 1, looking in the direction of the arrows, Figure 4 is an elevation looking at the inner face of one of the side members of the harp, Figure 5 is a detail perspective view showing one of the bearing cups employed, and Figure 6 is a fragmentary horizontal section showing the manner in which the harp is secured upon the trolley pole.

In carrying the invention into effect, I employ mating side members 10 and 11 respectively, which, at their lower ends, are formed with companion inwardly offset sleeve sections 12 and 13 mating to receive a trolley pole as conventionally shown at 14, therebetween. Engaged through the lower end portion of the sleeve and through the trolley pole is a rivet or other suitable fastening device 15 and engaged through the upper end portion of the sleeve and through the trolley pole is, as shown in detail in Figure 6 of the drawings, a cap screw 16 freely fitted through the sleeve section 12 and threaded into the sleeve section 13. This screw serves to clamp the side members together at their forward ends as well as secure the sleeve sections about the trolley pole. The head of the screw 16 is slotted, and removably fitted through the sleeve section 12 to engage in one of said slots is a cotter pin 17 locking the screw against counter-rotation. Thus, as will be seen, the harp is firmly and safely secured to the trolley pole so that the harp cannot accidentally work loose therefrom. Depending from the sleeve sections 12 and 13 are mating portions of an apertured lug 18 through which may be engaged a trolley rope, as conventionally shown at 19. Medially the side members 10 and 11 are enlarged both laterally and vertically to provide grease chambers 20 and from said chambers, the rearwardly extending portions of said members are deflected downwardly in angular relation to the forwardly directed portions of the members and, at their rear ends are, as particularly shown in Figure 2, formed with tubular mating spacing lugs 21 and 22. Freely fitted through the lug 21 and threaded into the lug 22 is a cap screw 23 clamping the side members together at their rear ends. Like the cap screw 16, the head of the cap screw 23 is slotted and fitted through the lug 21 to engage in one of said slots is a cotter pin 24 securing the screw against accidental displacement.

Extending transversely of the grease chambers 20 are semi-spherical bearing cups 25 each formed with a series of apertures 26 through the inner end portion thereof and provided with a centering stud 27. These bearing cups are of hardened material and are pressed into position, the studs 27 fitting snugly through suitable openings in the outer side walls of the chambers while the inner side walls of said chambers are provided with openings to snugly receive the cups at their rims. The cups will thus be rigidly supported and, as will be observed, the cavities of the grease chambers 20 completely surround the cups. Formed in the outer side walls of said chambers are openings 28. By the use of a grease gun, lubricant may be readily introduced into the chambers through these openings so that the grease will stand around the cups within the chambers. Journaled by the bearing cups is a trolley wheel 29. The wheel may be of any approved material and pressed through the hub of the wheel is an axle 30. This axle, like the bearing cups 25, is also of hardened material and, at its end portions, is formed with substantially semi-spherical trunnions 31 fitting in the bearing cups 25 and rotatably supporting the wheel. At their ends the trunnions are, as particularly shown in Figure 3, formed with flat faces so that small grease cavities 32 are thus provided within the cups at the ends of the trunnions and, as will be observed, the series of openings 26 communicate with these cavities. Formed in the axle at the ends of the hub of the trolley wheel are annular grooves 33.

As will now be readily understood in view of the preceding description, after the grease chambers 20 have been filled, lubricant will be constantly supplied through the openings 26 of the bearing cups to the interior of said cups so that the trunnions 31 of the axle of the trolley wheel will be at all times effectually lubricated. Lubricant will, of course, tend to collect within the cavities 32 and from these cavities will feed downwardly around the trunnions 31 so that the entire surfaces of said trunnions will be grease coated. Wear upon the trunnions as well as upon the bearing cups will thus be reduced to a minimum. Any grease working out at the rims of the cups will tend to collect within the grooves 33. In this connection it is to be observed that since the grease within the chambers 20 entirely surrounds the bearing cups, possible heating of the cups will be materially retarded.

Attention is now directed to the fact that should it become necessary the bearing cups 25 may be readily renewed. However, any slight wear upon said cups or upon the trunnions 31 of the axle of the trolley wheel may be readily taken up by simply filing off the meeting ends of the lugs 21 and 22 and tightening the clamp screw 23. To replace the trolley wheel it is simply necessary to separate the side members 10 and 11 when the old wheel may be removed and a new wheel readily substituted therefor. Further, attention is directed to the fact that, in the practical use of the device, the harp will not interfere with the engagement of the trolley wheel with the trolley wire. This is due to the fact that the rearwardly directed portions of the side members of the harp are deflected downwardly so that when the trolley wheel moves upwardly toward a vertical position, the lugs 21 and 22 at the rear of the wheel will not touch the wire.

Having thus described the invention, what is claimed as new is:

1. A trolley harp including side members having lubricant chambers provided with openings in the side walls thereof, substantially semi-spherical bearing cups having studs at their outer ends fitting in the openings in the outer side walls of the chambers, the rims of the cups fitting in the openings in the inner side walls of the chambers, the walls of the cups being provided with openings communicating with the chambers, and a trolley wheel having an axle provided with substantially semi-spherical trunnions fitting in said cups.

2. A trolley harp including side members having lubricant chambers, substantially semi-spherical bearing cups carried by the members in communication with said chambers, and a trolley wheel having an axle provided with substantially semi-spherical trunnions journaled in said cups.

3. A trolley harp including side members provided at their forward ends with sleeve sections abutting to provide a trolley pole sleeve, means holding the forward end portions of said members in abutting relation and engageable through a trolley pole fitted in said sleeve, bearings carried by the members, and a trolley wheel journaled in said bearings.

4. A trolley wheel including side members having at their forward ends sleeve sections mating to provide a trolley pole sleeve and at their rear ends abutting spacing lugs, means clamping the forward end portions of said members together and engageable with a trolley pole fitted in said sleeve, means extending through said lugs clamping the rear end portions of said members together, bearings carried by the members, a trolley wheel journaled by said bearings, and means locking said first and second mentioned means against displacement.

5. In a trolley harp, the combination of mating side members, bearing cups carried by the members, a trolley wheel having an axle journaled in said cups, and adjustable means connecting the members whereby said members may be cut away and said means adjusted for reducing the effective distance between the cups and taking up wear between the axle and the cups.

6. A trolley harp including side members having lubricant chambers, substantially semi-spherical bearing cups carried by the members in communication with said chambers, and a trolley wheel having an axle provided with substantially semi-spherical trunnions journaled in the cups and provided with flattened ends defining lubricant cavities within the cups.

7. A trolley harp including separable side members, a trolley wheel journaled between said members, means securing the members together, and means locking the first means against displacement.

8. A trolley harp including side members, a trolley wheel journaled between said members, means securing the members together and provided with slots, and means coacting between one of the members and the first means engaging in said slots locking the first means against displacement.

In testimony whereof I affix my signature.

FREDERICK THORNTON. [L. s.]